US011818215B1

(12) United States Patent
Guzik et al.

(10) Patent No.: US 11,818,215 B1
(45) Date of Patent: Nov. 14, 2023

(54) EXTERNAL DEVICE MANAGEMENT

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/962,283

(22) Filed: Oct. 7, 2022

(51) Int. Cl.
*H04L 67/12* (2022.01)
*H04N 23/60* (2023.01)

(52) U.S. Cl.
CPC .............. *H04L 67/12* (2013.01); *H04N 23/60* (2023.01)

(58) Field of Classification Search
CPC ................................ H04L 67/12; H04N 23/60
See application file for complete search history.

(56) References Cited

U.S. PATENT DOCUMENTS

| 10,721,122 | B1 * | 7/2020 | Argenti | H04L 67/51 |
| 2018/0350405 | A1 * | 12/2018 | Marco | G11B 27/031 |
| 2023/0074279 | A1 * | 3/2023 | Spitzer-Williams | G08B 25/016 |

* cited by examiner

*Primary Examiner* — Normin Abedin
(74) *Attorney, Agent, or Firm* — Han Santos, PLLC

(57) ABSTRACT

Methods, systems, and apparatus, including computer programs encoded on a computer storage medium, to manage devices during emergent conditions are disclosed. In one aspect, a method includes the actions of receiving, by a first computing device, data indicating a function of a second computing device. The actions further include determining, by the first computing device, a context of the second computing device. Based on the context of the second computing device, the actions further include determining, by the first computing device, whether to activate the function of the second computing device. Based on determining whether to activate the function of the second computing device, the actions further include determining, by the first computing device, whether to output, to the second computing device, an instruction to activate the function.

20 Claims, 3 Drawing Sheets

EXTERNAL DEVICE MANAGEMENT

TECHNICAL FIELD

This specification generally relates to remotely controlling the functionality of devices.

BACKGROUND

Police officers carry various types of equipment on their person and in their vehicles. Each of these devices may perform various functions. For example, a body camera may be configured to record audio and video. A radio may be configured to transmit and receive audio. A mobile phone may be configured to transmit and receive data over a network.

SUMMARY

A police officer carries multiple devices on person in the course of duty. These devices form a personal area network for the officer. However, there are other devices that are not carried by the officer that could be advantageously utilized, especially in critical times such as during high priority, high risk events.

A hub is communicatively coupled to the various devices in the officer's personal area network. The hub is aware of the functionality of the various devices in the personal area network. The hub may be located in a vehicle of the officer or on the officer's person. The hub may communicate with the various devices to control when their various services are needed or not needed. The hub may also identify and communicate with other devices that are not in the officer's personal area network, at least on a temporary basis. The hub, in managing the devices for functionality and power, may find a situation in which other devices could be used temporarily to enhance coverage and/or amend for some loss of functionality among the connected devices. This management of these additional devices may be based on geographic proximity to the officer and/or to the other connected devices. The management may also be based on the emergent circumstances that may include a high priority event, high risk situation, particular event, the officer being alone, and/or any other similar situation. As an example, these other devices may include a camera on a building or devices currently associated with another officer who is in geographic proximity to the officer.

An innovative aspect of the subject matter described in this specification may be implemented in methods that include the actions of receiving, by a first computing device, data indicating a first function of a second computing device; determining, by the first computing device, a context of the second computing device; based on the context of the second computing device, determining, by the first computing device, a type of data to collect; determining, by the first computing device, that the first function of the second computing device is not capable of generating the type of data; in response to determining that the first function of the second computing device is not capable of generating the type of data, identifying, by the first computing device, a third computing device that is configured to perform a second function that is capable of generating the type of data; and generating, for output by the first computing device and to the third computing device, an instruction to activate the second function that is capable of generating the type of data.

These and other implementations can each optionally include one or more of the following features. The action of identifying the third computing device that is configured to perform a second function that is capable of generating the type of data includes determining that the third computing device is within a threshold distance of the first computing device or the second computing device. The actions further include determining, by the first computing device, that the third computing device is outside of the threshold distance of the first computing device or the second computing device; and based on determining, by the first computing device, that the third computing device is outside of the threshold distance of the first computing device or the second computing device, generating, for output by the first computing device and to the third computing device, an indication that the first computing device ceases control of the second function.

The actions further include, based on the type of data to collect, determining, by the computing device, the threshold distance. The actions further include, based on the context of the second computing device, determining, by the first computing device, the threshold distance. The actions further include determining, by the first computing device, a context of the first computing device. The action of determining the type of data to collect is further based on the context of the first computing device. The actions further include determining, by the first computing device, characteristics of the third computing device. The action of identifying the third computing device is further based on the characteristics of the third computing device.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. The hub manages connected devices in a personal area network, including suspending and activating functionality of each device in accordance with any given context and other factors. The hub maintains a messaging broker to communicate with the connected devices. The hub maintains functionality of the personal area network. The hub activates and deactivates the functionality of the connected devices based on emergent conditions. The hub may be able to temporarily and automatically add devices to to the personal area network of an officer. The hub may add the devices based on geographic proximity to the officer and/or to a specific location such as the location of an event. Adding devices may allow the hub to provide capture additional content beyond the scope of the devices of the personal area network of the officer.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
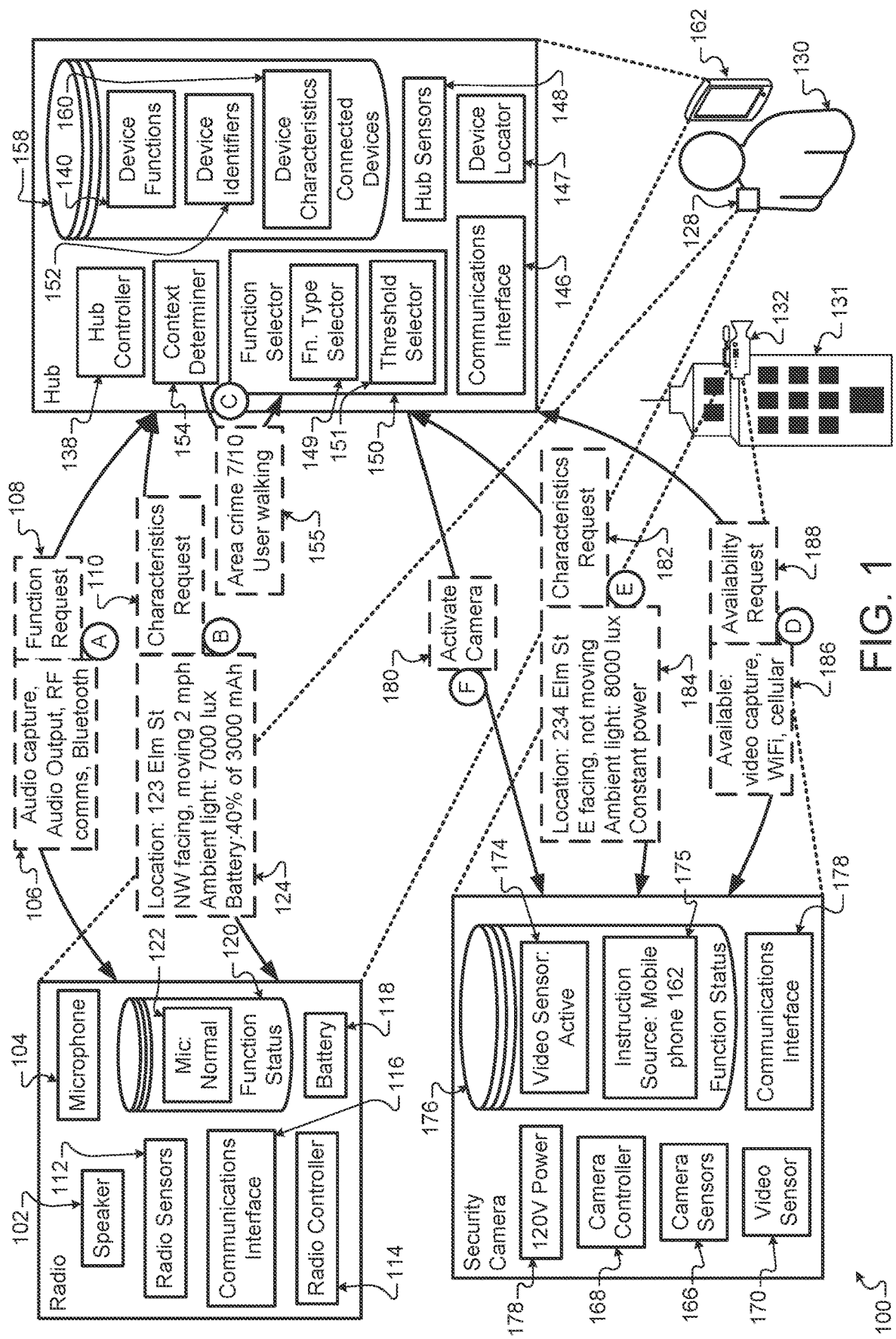
FIG. 1 illustrates an example system that is configured to manage the functionality of various devices.

FIG. 1 illustrates an example system 100 that is configured to manage the functionality of various devices. Briefly, and as described in more detail below, the user 130 may be utilizing multiple devices. These devices may include a radio 128 and a mobile phone 162. The mobile phone 162 may operate as a hub that is configured to manage the operations of the radio 128 and any other connected devices. The mobile phone 162 may determine what functions the radio 128 is capable of performing. Based on the situation, the mobile phone 162 may activate some of those functions. In some instances, the situation may dictate that the radio 128 and other connected devices perform a function that they cannot. In this case, the mobile phone 162 may search for a nearby device that is capable of performing that function. Once identified, the mobile device 162 may instruct that device to perform the function. FIG. 1 includes various stages A through F that may illustrate the performance of actions and/or the movement of data between various components of the system 100. The system 100 may perform these stages in any order.

In more detail, the user 130 may be a police officer who is carrying various types of equipment in the vehicle of the user 130 and the body of the user 130. The equipment may include a radio 128 that includes a microphone 104, a speaker 102, and a communications interface 116. The communications interface 116 may be configured to transmit and receive voice communications using various techniques. These techniques may include radio frequency communications, Wi-Fi, short range radio, cellular communications, and/or any other similar wireless or wired communication technique. The microphone 104 may be configured to detect audio and transmit that audio to the communications interface 116. The communications interface 116 may output the audio data to another radio and/or a communications network. The speaker 102 may be configured to receive audio data from the communications interface 116 and output the audio data.

The radio 128 may include radio sensors 112 that are configured to detect various characteristics of the radio 128 and/or the environment of the radio 128. For example, the radio sensors 112 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The radio 128 may include a battery 118 to provide power to the various components. The radio 128 may be configured to receive power from another device such as a power supply, power adapter, and/or any other similar device. This power may be used to charge the battery 118. In some implementations, the radio 128 may provide the power to the various components of the radio 128.

The radio 128 may include a radio controller 114 that is configured to manage the various components of the radio 128. The radio controller 114 may be implemented by one or more processors executing software stored on a storage device accessible by the processors. The radio controller 114 may manage the processing of the audio data detected by the microphone before and during the communications interface 116 outputting of the processed audio data. The radio controller 114 may manage the processing of audio data received through the communications interface 116 before and during the speaker 102 outputting the received audio data. The radio controller 114 may receive the sensor data from the radio sensors 112 and provide the sensor data to the various destinations that may include the communications interface 116.

In some implementations, the radio controller 114 may be configured to control whether any of the components are active or not. For example, the radio controller 114 may be configured to deactivate the microphone 104. Deactivating the microphone 104 may prevent the microphone 104 from detecting audio. The radio controller 114 may deactivate the speaker 102 that may prevent the speaker 102 from outputting audio. The radio controller 114 may deactivate one or more of the radio sensors 112 that may prevent the deactivated radio sensor from generating sensor data. The radio controller 114 may also reactivate any of the deactivated components. The radio controller 114 may also control the techniques that the communications interface 116 may use to communicate with other devices. For example, the radio controller 114 may deactivate the Wi-Fi feature of the communications interface 116. The radio controller 114 may store the activation status of the various components in the function status 120. The function status 120 may be implemented in a storage device that is accessible by the radio controller 114.

The equipment that the user 130 may carry may also include a mobile phone 162. The mobile phone 162 may include various components that facilitate the mobile phone 162 operating as a hub that manages the various devices that the user 130 carries and the various devices that the user 130 utilizes but may not carry, such as those that may be in a vehicle. In this way, the mobile phone 162 may manage the personal area network of the user 130. The personal area network may include the mobile phone 162, the radio 128, and any other devices that mobile phone 162 may be able to manage. The mobile phone 130 includes a hub controller 138. The hub controller 138 may be implemented by one or more processors executing software stored on a storage device accessible by the processors. The hub controller 138 may be configured to manage the various components of the mobile phone 162. The components may include a communications interface 146, hub sensors 148, a function selector 150, a device locator 147, and a context determiner 154. The communications interface 146 may be configured to transmit and receive data using various techniques. These techniques may include radio frequency communications, Wi-Fi, short range radio, cellular communications, and/or any other similar wireless or wired communication technique. The hub controller 138 may be configured to instruct the communications interface 146 to utilize a particular communications technique and/or prevent communications using a particular communications technique. For example, the hub controller 138 may instruct the communications interface 146 to deactivate the cellular communications. As another example, the hub controller 138 may instruct the communications interface 146 to only utilize short range radio.

The hub sensors 148 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub controller 138 may be configured to activate or deactivate any of the hub sensors 148. The hub controller 138 may also be configured to provide the hub sensor data to the communications interface 146 for output, to a storage device, and/or to another component of the mobile phone 162 for further processing.

The context determiner 154 may be configured to determine the context of the mobile phone 162, any other devices communicating with the mobile phone 162, and/or the user 130. The context determiner 154 may analyze the hub sensor data, the radio sensor data, audio data from the radio 128, function data from the radio 128, and/or additional data from other devices. The context determiner 154 may determine a likely context of the mobile phone 162 and/or any other devices communicating with the mobile phone 162, such as the radio 128, based on this analysis. The context may indicate the likely actions in which the user 130 may be participating, the activities that may likely be occurring around the user 130, the likely path of the user 130, the weather around the user 130, and/or any other similar context.

The hub controller 138 may maintain a record of the devices that the hub controller 138 manages. This record may include identifiers for each of the devices and data related to each device such as the characteristics of the devices and the functions of the devices. The mobile phone 162 may include a connected devices storage 158. The connected devices storage 158 may implemented in a storage device that is accessible by the hub controller 138. The connected devices storage 158 may include the device identifiers 152. The device identifiers 152 may include data identifying each of the devices that the mobile phone 162 is managing. In the example of FIG. 1, the device identifiers 152 may include data identifying the radio 128.

The connected devices storage 158 may include the device characteristics 160 and the device functions 140 for the devices referenced in the device identifiers 152. The device functions 140 may include data related to the capabilities of the corresponding devices. The device functions 140 may be related to the tasks that the corresponding device is configured to perform. The device may perform the function using hardware and/or software. In some implementations, the hub controller 138 may request that devices indicate, to the mobile phone 162, the functions that the corresponding devices are capable of performing. In some implementations, the devices may provide an indication of their corresponding functions upon connecting to the mobile phone 162. In some implementations, the devices may provide an indication of their corresponding functions upon an update to the functions of the device. For example, if a device receives a software update that allows the device to perform a new function, then the device may provide an indication to the mobile phone 162 indicating the new function. If a device loses a function, then the device may provide an indication to the mobile phone 162 indicating the lost function.

The device characteristics 160 may be related to the aspects of the devices that change more frequently than the functions. In some implementations, the device characteristics 160 may be related to the aspects of the devices that are not related to the devices performing an action. In some implementations, the device functions 140 may be related to the functions of the devices that may change with changes in hardware and/or software, and the device characteristics 160 may be other aspect of the devices.

In stage A, the hub controller 138 may access the device identifiers 152 and determine that the radio 128 is communicating with the mobile phone 162. The hub controller 138 may determine that the device functions 140 may not include the functions of the radio 128. In some implementations, the hub controller 138 may determine that the device functions 140 for the radio 128 have not been updated in a threshold period of time. The hub controller 138 may generate a function request 108 and provide the function request 108 to the communications interface 146 along with instructions to provide the function request 108 to the radio 128. The communications interface 146 transmits the function request 108 to the radio 128. The communications interface 116 receives the function request 108 and provides the function request 108 to the radio controller 114. The radio controller 114 determines that the functions of the radio 128 include the ability to capture audio, output audio, communicate using RF communications, and communicate using short range radio. The radio controller 114 may generate the function response 106 that indicates these functions. The radio controller 114 may provide function response 106 to the communications interface 116 that then provides the function response 106 to the communications interface 146 of the mobile phone 162. The hub controller 138 stores the function response 106 in the device functions 140. The device functions 140 then indicate that the radio 128 has the functions of capturing audio, outputting audio, communicating using RF communications, and communicating using short range radio.

In stage B, the hub controller 138 may determine that the device characteristics 160 may not include the characteristics of the radio 128 and the body camera 132. In some implementations, the hub controller 138 may determine that the device characteristics 160 for the radio 128 and the body camera 132 have not been updated in a threshold period of time. The threshold period of time for the device characteristics 160 may be different than the threshold period of time for the device functions 140. For example, the threshold period of time for the device characteristics 160 may be two hours while the threshold period of time for the device functions 140 may be two weeks.

The hub controller 138 may generate a characteristics request 110 and provide the characteristics request 110 to the communications interface 146 along with instructions to provide the characteristics request 110 to the radio 128. The communications interface 146 transmits the characteristics request 110 to the radio 128. The communications interface 116 receives the characteristics request 110 and provides the characteristics request 110 to the radio controller 114. The radio controller 114 determines that the characteristics of the radio 128 include the location of the radio 128 being 123 Elm Street, the radio 128 facing northwest and moving at two miles per hour, the ambient light in the vicinity of the radio 128 being eight thousand lux, and the battery 118 is a three thousand milliamp hour battery with forty percent capacity remaining. The radio controller 114 may generate the characteristics response 124 that indicates these characteristics. In some implementations, the radio controller 114 may access the sensor data generated by the radio sensors 112 in response to receiving the characteristics request 110. For example, the radio controller 114 may determine the ambient temperature of the radio 128, the humidity near the radio 128, and/or any other similar environmental conditions of the radio 128. The radio controller 114 may include those conditions in the characteristics response 124.

The radio controller 114 may provide characteristics response 124 to the communications interface 116 that then provides the characteristics response 124 to the communications interface 146 of the mobile phone 162. The hub controller 138 stores the characteristics response 124 in the device characteristics 160. The device characteristics 160 then indicate that the radio 128 has twenty percent capacity remaining in the battery.

The hub controller 138 determines that the device characteristics 160 and the device functions 140 are up to date and include data that corresponds to the devices in the device identifiers 152. Based on this determination and in stage C, the hub controller 138 may instruct the context determiner 154 to determine the context of the mobile phone 162 and/or the context of the radio 128. The context determiner 154 may access the hub sensor data generated by the hub sensors 148. The context determiner 154 may also access the device identifiers 152 to determine that devices that are included in the personal area network of the user 130. The context determiner 154 may access the device characteristics 160 that may include sensor data collected by the sensors of the connected devices such as the body camera sensors 166 and the dashboard camera sensors 112. The context determiner 154 may also access public sources of information that may relate to news, weather, current event, public crime data, court records, and/or any other similar activity that may be affecting what is occurring in the vicinity of the mobile phone 162. These public sources may include websites available on the internet, public APIs, radio signals, and/or any other similar public data. The context determiner 154 may also access private data sources. The private data sources may include intranet data related to an employer of the user 130. For example, the user 130 may be a police officer and the private data may relate information related to ongoing investigations, non-public crime data, and/or any other similar internal police data.

In some implementations, the connected devices may include the built-in computer of a vehicle of the user 130. With the vehicle being a connected device, the device identifiers may include data identifying the vehicle and the built-in computer of the vehicle. The device functions 140 may include data identifying the various functions of the vehicle and the built-in computer of the vehicle. The device characteristics may include the various characteristics of the vehicle and the built-in computer of the vehicle, which may also include sensor data collected from the various sensors of the vehicle and the built-in computer of the vehicle. These sensors may include a speedometer, a location sensor, vehicle accessory monitors that may monitor the usage of various accessories of the vehicle (such as headlights, interior lights, air conditioning systems, heating systems, audio recording and output systems, sirens, flashing lights, radar gun, license plate reader, video recording and output systems, automatic door operators, and/or any other similar vehicle accessory), battery level monitors that measure the capacity of any batteries in the vehicle and the remaining power left in those batteries, a voltmeter that measures the voltage those batteries, various thermometers that measure the temperature of various components of the vehicle (for example, the temperature of various portions of the batteries, various portions of the motor, the ambient temperature, and any other similar locations), a hygrometer that measures the moisture content of the ambient air and/or the air inside any component of the vehicle, a water sensor that may detect the presence of water in and/or around any component of the vehicle, and/or any other similar sensors.

The context determiner 154 may analyze each of these sources of data to determine a likely context of the user 130, the mobile phone 162, and/or the radio 128. The context may indicate the likely activity in which the user 130 is participating; the likely destination of the user 130, the radio 128, and/or the mobile phone 162; the likely path that the user 130, the radio 128, and/or the mobile phone 162 will take to reach the likely destination; events that are likely occurring around the user 130, the radio 128, and/or the mobile phone 162; a crime level of the location of the user 130, the radio 128 and/or the mobile phone 162; and/or any other similar details related to the user 130, the radio 128, and/or the mobile phone 162.

The context determiner 154 may analyze the hub sensor data generated by the hub sensors 148, the device functions 140, the device identifiers 152, the device characteristics 160, public data sources, and/or private data sources. Based on this analysis, the context determiner 154 may determine that the user 130 is likely walking and that the location of the user 130, the radio 128, and/or the mobile phone 162 has a crime score of seven out of ten.

This determination may be based on image data captured by the mobile phone 162, audio data captured by the mobile phone 162 and/or the radio 128, audio data output by the mobile phone 162 and/or the radio 128, and/or movement data generated by the sensors of the mobile phone 162 and/or the radio 128. This determination may also be based on the movement of the mobile phone 162 relative to the movement of the radio 128. This determination may also be based on analysis of public crime data and/or private data that may be related to crime and/or investigations.

The context determiner 154 may generate the context data 155 that indicates the crime score of seven out of ten and that the user 130 is likely walking. The context determiner 154 may provide this context data 155 to the function selector 150. In some implementations, the context determiner 154 may continuously determine the context of the mobile phone 162, the radio 128, and/or any of the connected devices and provide updated context data to the function selector 150. The context determiner 154 may perform this continuous analysis in response to an instruction from the hub controller 138 and may provide updated context data to the function selector 150. The hub controller 138 may later provide an instruction to the context determiner 154 to cease determining the context of the mobile phone 162, the radio 128, and/or any of the connected devices.

In some implementations, the context determiner 154 may be configured to periodically determine the context of the mobile phone 162 and/or any of the connected devices. The context determiner 154 may determine the context data 155 without express instructions from the hub controller 138 and/or any other component of the mobile phone 162 or other device. The context determiner 154 may analyze the hub sensor data generated by the hub sensors 148, the device functions 140, the device identifiers 152, the device characteristics 160, public data sources, and/or private data sources, for example, every fifteen minutes. In some implementations, the context determiner 154 may adjust the frequency of this analysis. For example, if the context determiner 154 receives an indication that the user 130 is off duty, then the context determiner 154 may analyze the hub sensor data generated by the hub sensors 148, the device functions 140, the device identifiers 152, the device characteristics 160, public data sources, and/or private data sources every hour. If the context determiner 154 receives an indication that the user 130 is on duty, then the context determiner 154 may analyze the hub sensor data generated by the hub sensors 148, the device functions 140, the device identifiers 152, the device characteristics 160, public data sources, and/or private data sources every five minutes.

In some implementations, the context determiner 154 may analyze the sensor data generated by the hub sensors 148 and/or the device characteristics 160 to determine the frequency to determine the context data 155. The context determiner 154 may adjust the frequency if the sensor data generated by the hub sensors 148 and/or the device characteristics 160 indicates that the mobile phone 162 and/or another connected device is moving at a speed that is greater than a threshold speed, that a sound that is satisfies a threshold is in the vicinity of the user 130 and/or a connected device, and/or any other similar sensor data satisfies a threshold. If the connected devices include a firearm holster sensor, then the context determiner 154 may increase the frequency if the user 130 removes the firearm from the holster and/or unbuckles the holster. The context determiner 154 may decrease the frequency if the user 130 returns the firearm to the holster. In some implementations, the user 130 may manually activate one of the connected devices. For example, the user 130 may activate the microphone 104 of the radio 128. This activation may cause the context determiner 154 to increase the analysis frequency. If the user 130 manually deactivates the device, then the context determiner 154 may decrease the frequency analysis a period of time after the deactivation and/or once the deactivation occurs.

In some implementations, the context determiner 154 may analyze the public and/or private data and determine an event is occurring that may indicate to adjust the frequency. For example, the private data may include dispatch data indicating that a firearm was discharged at a specific location. As the user 130, the radio 128, and/or the mobile phone 162 approaches that location, then the context determiner 154 may continuously increase the analysis frequency as the user 130, the radio 128, and/or the mobile phone 162 moves closer to the location.

The function selector 150 may receive the context data 155. The function selector 150 may receive an instruction from the hub controller 138 to determine whether to activate and/or deactivate any of the functions of the devices communicating with the mobile phone 162. In some implementations, the function selector 150 may determine whether to activate and/or deactivate any of the functions of the devices communicating with the mobile phone 162 in response to receiving the context data. The function selector 150 may analyze the device functions 140, the context data 155, and/or the device characteristics 160 to determine whether to activate and/or deactivate any of the device functions.

The process that the function selector 150 may utilize to determine whether to activate and/or deactivate any of the device functions will be discussed in more detail with respect to FIG. 2. To summarize, the function selector 150 may use one or more models and/or rules to analyze the device functions 140, the context data 155, and the device characteristics 160. In some implementations, the function selector 150 may select the rules and/or models based on the context data 155. In some implementations, the function selector 150 may also analyze the hub sensor data generated by the hub sensors 148. In some implementations, the device characteristics 160 may include the radio sensor data generated by the radio sensors 112. The rules may specify how to compare the device functions 140, the context data 155, the device characteristics 160, and/or the hub sensor data. The rules may include various thresholds and/or ranges to compare to the device functions 140, the context data 155, the device characteristics 160, and/or the hub sensor data. Based on how those thresholds and/or ranges compare to the device functions 140, the context data 155, the device characteristics 160, and/or the hub sensor data, the rules may specify to activate and/or deactivate specific functions of specific devices. The models may be configured to receive the device functions 140, the context data 155, the device characteristics 160, and/or the hub sensor data and output data indicating which of the functions of the connected devices should be active and/or which of the functions of the connected device should be deactivated.

In some implementations, the rules and/or models may be configured to receive data identifying the various functions that the function selector 150 is configured to manage. The data identifying the various functions may include additional functions than those included in the device functions 140. For example, the connected devices may include the radio 128 and no other devices. In this case, the device functions 140 may include audio capture, audio output, RF communications, and short-range radio communications. The various functions that the function selector 150 is configured to manage may include image capture, video capture, spotlight activation, lights and sirens activation, radar activation, cellular communications, short range radio communications, infrared communications, Wi-Fi communications, and/or any other similar function. The rules and/or models that are configured to receive the data identifying the various functions that the function selector 150 is configured to manage may be configured to output data indicating the functions that the mobile device 162 should be controlling. In this case, the functions that the mobile device 162 should be controlling may include functions that the currently connected devices are not capable of performing.

In some implementations, the rules and/or models may be configured to output an exception or error indicating that there is not a function in the device functions 140 that is appropriate based on the context data 155 and and the device characteristics 160. In this case, the function selector 150 may not identify a specific function that the function selector 150 indicates the mobile phone 162 should control. The function selector 150 may request input from the user 130 and/or from another computing device to identify an appropriate function.

In some implementations, the function selector 150 may include a function type selector 149. The function type selector 149 may be configured to identify a type of function that the mobile phone 162 should manage based on the context 155 and/or the device characteristics 160. The function type selector 149 may identify types of functions such as image capture, audio capture, video capture, audio output, image output, video output, spotlight activation, lights and sirens activation, radar activation, cellular communications, and/or any other similar function. The function type selector 149 may utilize rules and/or models to analyze the context 155 and/or the device characteristics 160. For example, the function type selector 149 may determine that the mobile phone 162 should utilize video capture if the crime score for the location of the user 130 is greater than a threshold. The function type selector 149 may determine that the mobile phone 162 should utilize RF communications if cellular and Wi-Fi communications are unavailable. The function type selector 149 may determine that additional light may be needed if the ambient light is below one thousand lux and the crime score is greater than a threshold, gun shots have been detected within a threshold distance, and/or the user 130 has been dispatched to the current location of the user 130. The function type selector 149 may be configured to identify one or more types of functions that the mobile phone 162 should manage based on that function not being included in the device functions 140. Additionally, or alternatively, the function type selector 149 may identify the one or more types of functions that the mobile phone 162 should manage independent of the functions included in the device functions 140.

In some implementations, the function selector 150 may include a threshold selector 151. The threshold selector 151 may be configured to determine the threshold distance between the user 130, the mobile phone 162, and/or another connected device and a device that is configured to perform the function or functions identified by the function type selector 149. The threshold selector 151 may determine the threshold distance based on the context 155, the device characteristics 160, and/or the function types identified by the function type selector 149. The threshold selector 151 may use various rules and/or models to analyze the context 155, the device characteristics 160, and/or the identified function types. Based on the analysis, the threshold selector 151 determines a distance for searching for a device that is capable of performing the identified type of function. The threshold selector 151 may specify whether the threshold distance should be measures from the user 130, the mobile phone 162, and/or another connected device. For example, the threshold selector 151 may analyze data indicating that a gunshot occurred within two hundred meters of the mobile phone 162 and the identified type of function is video capture. The threshold selector 151 may determine that the threshold distance should be fifty percent more than the distance between the user 130 and/or mobile phone 162 and the video capture device, or three hundred meters. As another example, the threshold selector 151 may analyze data indicating that additional light is needed, and the ambient light is one thousand lux. The threshold selector 151 may determine that a light source should be located at least one hundred meters from the user 130 and/or the mobile phone 162. In some implementations, the threshold selector 151 may receive context data 155 that indicates an expected travel path of the user 130 and/or the mobile phone 162. In this case, the threshold selector 151 may specify threshold distances from the expected path.

The mobile phone 162 may include a device locator 147. The device locator 147 may be implemented by one or more processors executing software stored on a storage device located on and/or accessible by the mobile phone 162. The device locator 147 may be configured to generate availability requests that indicate the need for a type of function identified by the function type selector 149. The availability requests may indicate the type of function and a request to control the function for a specified period of time. The time may be based on the movement of the user 130 and/or the mobile phone 162 and the threshold distance. For example, the user 130 may be moving at one meter per second, and the threshold distance is two hundred meters. In this case, the period of time may be the likely time to cover twice the threshold distance, which would be six minutes and forty seconds. In some implementations, the device locator 147 may increase this time period request, for example, doubling or tripling the period. The time period may be based on the location from which the threshold distance is measured. For example, a fixed location such as a location to where the user 130 is dispatched, may cause the device locator 147 to select a longer time period. The time period may be based on the expected resolution of the event at the location, the crime score of the location, and/or any other similar factor. In some implementations, the time period request may be based on the type of function. For example, a request to control a light source may include a time period based on the next sunrise time. A request to control a camera may include a time period based on the time at the user 130 and/or the mobile phone 162 is expected to be within the threshold distance.

In the example of FIG. 1, the function type selector 149 may analyze the device functions 140, the context data 155, sensor data from the hub sensor 148, and the device characteristics 160. The device functions 140 may include the functions of radio 128. The device characteristics 160 may include the characteristics of the radio 128. The context data 155 may indicate that the area in the vicinity of the user 130, the radio 128, and/or the mobile phone 162 has a crime score of seven out of ten, and that the user 130 is likely walking. The function type selector 149 may determine that the mobile phone 162 should access a video capture device and that the radio 128 is not configured to capture video.

The threshold selector 151 may analyze the device functions 140, the context data 155, sensor data from the hub sensor 148, the identified function type, and the device characteristics 160. Based on the crime score being above a threshold of six out of ten, the threshold selector 151 may determine that the video capture device should be located within two hundred meters of the user 130, the radio 128, and/or the mobile phone 162 and/or within two hundred meters of the expected route of the user 130 the radio 128, and/or the mobile phone 162. The threshold selector 151 may provide this threshold distance to the device locator 147.

The device locator 147 may analyze the threshold distance of two hundred meters, the context data 155, the sensor data from the hub sensor 148, the identified function type, and/or the device characteristics 160. Based on this analysis, the device locator 147 may generate an availability request 188. The availability request 188 may include a request to generate and provide video data for a specified period of time. The specified period of time may be three hours based on the expected route of the user 130, the radio 128, and/or the mobile phone 162 and/or the expected destination and activity of the user 130. The device locator 147 may provide the availability request 188 to the communications interface 146.

In stage D, the communications interface 146 may broadcast the availability request 188 using various communication protocols. The communications interface 146 may attempt to cast a wide net to identify a device that is willing to comply with the request. The communications interface 146 may broadcast the availability request 188 over a network and/or request that other devices output the availability request 188. The other devices may be those devices belonging to other users associated with the user 130, such as coworkers or other officers.

The security camera 132 may be one of the devices that receives that availability request 188 and determines to respond to the availability request 188. The security camera 130 may be located on the building 131. The security camera 132 may not be a device that is connected to the mobile phone 162 in the same way that the radio 128 is connected to the mobile phone. In other words, the security camera 132 is not in the personal area network of the user 130.

The security camera 132 may include a video sensor 170, a microphone 172, and a communications interface 164. The communications interface 164 may be configured to transmit and receive communications using various techniques. These techniques may include Wi-Fi and cellular communications. The video sensor 170 may be configured to generate video data. The video sensor 170 may be configured to output the video data to a storage device and/or a communications network using the communications interface 164. The storage device may be located on or accessible by the security camera 132.

The security camera 132 may include camera sensors 166 that are configured to detect various characteristics of the security camera 132 and/or the environment of the security camera 132. For example, the camera sensors 166 may include an accelerometer, a microphone, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The security camera 132 may be connected to a power supply 178 to provide power to the various components.

The security camera 132 may include a camera controller 168 that is configured to manage the various components of the security camera 132. The camera controller 168 may be implemented by one or more processors executing software stored on a storage device accessible by the processors. The camera controller 168 may mange the processing of video data generated by the video sensor 170 before and during the communications interface 164 outputting of the processed video data and/or storing the video data. The camera controller 168 may receive the sensor data from the camera sensors 166 and provide the sensor data to the various destinations that may include the communications interface 164.

In some implementations, the camera controller 168 may be configured to control whether any of the components are active or not. For example, the camera controller 168 may deactivate the video sensor 172 that may prevent the video sensor 172 from generating video data. The camera controller 168 may deactivate one or more of the body camera sensors 166 that may prevent the deactivated body camera sensor from generating sensor data. The camera controller 168 may also reactivate any of the deactivated components. The camera controller 168 may also control the techniques that the communications interface 164 may use to communicate with other devices. For example, the camera controller 168 may deactivate the short range radio feature of the communications interface 164. The body camera controller 168 may store the activation status of the various components in the function status 176. The function status 176 may be implemented in a storage device that is accessible by the camera controller 168.

The communications interface 178 detects the availability request 188, and the camera controller 168 determines that the security camera 132 is available to comply with the request for video data for the requested three hour period. In response to the availability request 188, the camera controller 168 generates the availability confirmation 186. The availability confirmation 186 confirms that the security camera 132 is available to comply with the availability request 188. The availability confirmation 186 may also including data confirming that the security camera 132 is capable of video capture, cellular communications, and WiFi communications. The availability confirmation 186 may also include data identifying the location of the security camera 132, an orientation of the security camera 132, and/or any other similar information.

The communications interface 146 may receive the availability confirmation 186 and provide the availability confirmation 186 to the hub controller 138. The hub controller 138 may store data identifying the security camera 132 in the device identifiers 152. The hub controller 138 may also include data indicating that the security camera 132 is temporarily included in the personal area network of the user 130 and may include the time period for which the security camera 132 is in the personal area network of the user 130. The hub controller 138 may store the device function of the security camera 132 in the device functions 140. Thus, the device functions 140 may include data indicating that the security camera 132 is capable of video capture, cellular communications, and WiFi communications.

In stage E and with the security camera 132 effectively added to the personal area network of the user 130, the hub controller 138 may request the characteristics of the security camera 132. The hub controller 138 may generate a characteristics request 182 and provide the characteristics request 182 to the communications interface 146 along with instructions to provide the characteristics request 182 to the security camera 132. The communications interface 146 transmits the characteristics request 182 to the security camera 132. The communications interface 164 receives the characteristics request 182 and provides the characteristics request 182 to the camera controller 168. The camera controller 168 determines that the characteristics of the security camera 132 include the location being at 234 Elm St, the security camera 132 facing east and not moving, the ambient light sensed by the security camera 132 is eight thousand lux, and the security camera receiving constant power. The camera controller 168 may generate the characteristics response 184 that indicates these characteristics. In some implementations, the camera controller 168 may access the sensor data generated by the camera sensors 166 in response to receiving the characteristics request 182. The camera controller 168 may provide characteristics response 184 to the communications interface 164 that then provides the characteristics response 184 to the communications interface 146 of the mobile phone 162. The hub controller 138 stores the characteristics response 184 in the device characteristics 160.

In some implementations, the hub controller 138 may bypass stage E. This may be because the hub controller 138 has already determined to activate the video capture function of the security camera 132. In this way, the function selector 150 has already analyzed the data in the connected device storage 158. The function selector 150 may not reanalyze the data in the connected device storage 158 after receiving the characteristics response 184. Because of this, the hub controller 138 may bypass stage E.

With the security camera 132 confirmed as a device to capture video data and in stage F, the hub controller 138 may generate the activation request 180. The activation request 180 may indicate a time period for the security camera 132 to capture video data and a location to transmit the video data. The security camera 132 may receive the activation request 180 and begin complying with the request. The video sensor 170 may capture the video data and provide the video data to the communications interface 178. The communications interface 178 may provide the video data to the mobile phone 162 and/or a location specified by the mobile phone 162.

The camera controller 168 may update the function status 176 upon receipt of the activation request 180 or in response to transmitting the availability confirmation 186. The function status 176 may include the video sensor status 174 indicating that the video sensor 170 is active. The function status 176 may also include an instruction source 175. The instruction source 175 indicates the device that requested the security camera 132 capture and output the video data. In this case, the instruction source 175 indicates the source is the mobile phone 162.

In some implementations, the hub controller 138 may determine to adjust the time period for the security camera 132 to capture the video data. For example, the context determiner 154 may update the context data 155 to indicate that the user 130 is in the process or has traveled to another location. In this case, the function selector 150 may determine that the video capture function at the location of the security camera 132 is no longer necessary. The function selector 150 may request that the communications interface 146 instruct the security camera 132 to return to normal operation and stop transmitting video data to the mobile phone 162 other another specified location.

As another example, the context determiner 154 may update the context data 155 to indicate that the user 130 is in remaining in the location of the security camera 132 longer than expected. In this case, the function selector 150 may determine that the video capture function at the location of the security camera 132 is needed for longer than initially requested. The function selector 150 may request that the communications interface 146 request that the security camera 132 capture video data and continue transmitting that video data to the mobile phone 162 other another specified location. The security camera 132 may determine to comply or reject that request. If the security camera 132 complies with the request, then the function selector 150 may update the device functions 140 to indicate the additional time. If the security camera 132 rejects the request, then the function selector 150 may request that the device locator 147 start the process to identify another device to provide the video capture functionality.

At the conclusion of the specified time period and if the mobile phone 162 does not request any additional time from the security camera 132 or the security camera 132 rejects a request for additional time, the security camera 132 may return to normal operation. In this case, the security camera 132 may cease transmitting the video data to the mobile phone 162. The camera controller 168 may transmit a notification to the mobile phone 162 indicating that the security camera 132 will cease transmitting the video data to the mobile phone 162. The camera controller 168 may update the function status 176 to indicate that the instruction source 175 is no longer the mobile phone 162 and instead the camera controller 168. The video sensor status 174 may indicate normal operation.

In response to receiving the data indicating that the security camera 132 will cease transmitting the video data to the mobile phone 162, the hub controller 138 may update the connected devices storage 158. The hub controller 138 may update the device identifiers 152 to indicate that the security camera 132 is no longer active. The hub controller 138 may maintain data identifying the security camera 132 in the device identifiers 152 to assist in identifying possible devices to request data from in the future. In some implementations, the mobile phone 162 and other hubs in the organization of the user 130 may share the device identifiers 152 so that each device has a record of previous devices that have provided data.

Figure 2:
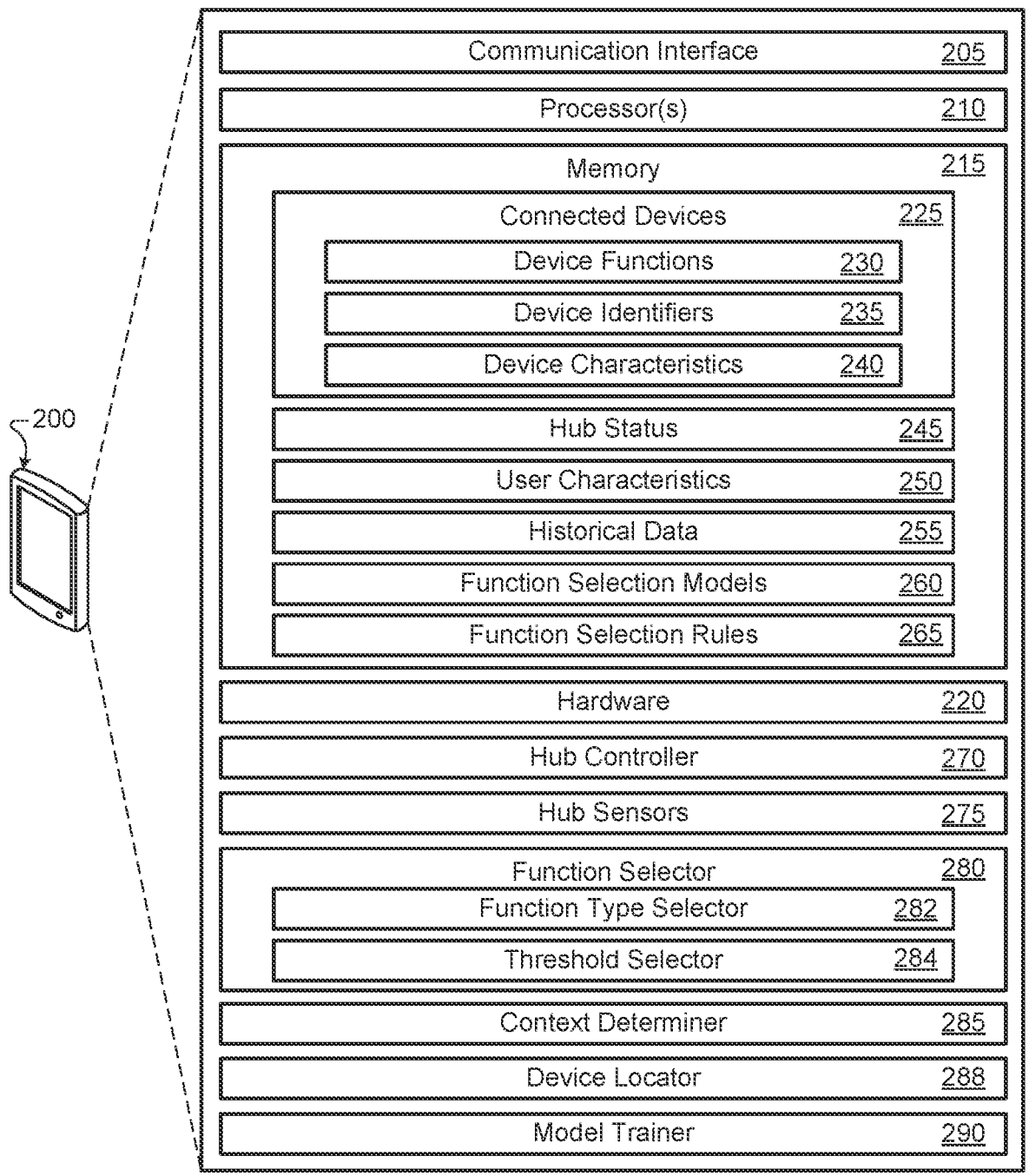
FIG. 2 illustrates an example server that is configured to manage the functionality of various devices.

FIG. 2 illustrates an example device 200 that is configured to manage the functionality of various devices. The device 200 may be any type of computing device that is configured to communicate with other computing devices. The device 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The device 200 may be similar to the mobile phone 162 of FIG. 1. Some of the components of the device may be implemented in a single computing device or distributed over multiple computing devices. Some of the components may be in the form of virtual machines or software containers that are hosted in a cloud in communication with disaggregated storage devices.

The device 200 may include a communication interface 205, one or more processors 210, memory 215, and hardware 220. The communication interface 205 may include communication components that enable the device 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a hub controller 270. The hub controller 270 may be similar to the hub controller 138 of FIG. 1. The hub controller 270 may be configured to perform multiple tasks. Those tasks may include managing the components of the device 200. For example, the hub controller 270 may instruct the communications interface 205 what type of connection to use to communicate with other devices. The hub controller 270 may instruct the communications interface 205 to communicate with a first device using short range radio and communicate with a second device using a cellular network. The tasks of the hub controller 270 may also include determining whether the device 200 should operate as the hub. The hub may be the device that provides instructions to other devices regarding what functions should be active on those devices and when those functions should be active. If the device 200 is not operating as the hub, then the device 200 may receive instructions regarding what functions of the device should be active and when those functions should be active.

The hub may change between various devices. There may be several devices that are capable of operating as the hub. Each user may have a group of devices with which the user interacts. For example, a police officer may have a radio, body camera, mobile phone, laptop computer, storage device, watch, tablet, a built-in computer of a vehicle, and/or any other similar device. Only some of these devices may be configured to operate as a hub. The mobile phone, vehicle computer, and/or laptop computer may be capable of operating as the hub. Each of these devices may include a hub controller that is similar to the hub controller 270.

To select the hub, each of the devices may have a series of rules and a hierarchy to determine which device should be the hub and/or determine which devices should not be the hub. The rules may relate to whether each device can detect other devices. The rules may also relate to the characteristics of each device such as the battery capacity. An example rule may indicate that if the hub controller 270 determines that the device 200 can communicate with each of the devices of the user, then the hub should be the device 200 unless the battery capacity is below thirty percent. If the battery capacity is below thirty percent, then the hub should be the built-in computer of the vehicle. Another example rule may indicate that if the hub controller 270 determines that the device 200 can communicate with each of the devices of the user, then the hub should be the built-in computer of the vehicle.

If the device 200 is operating as the hub, then the device 200 may operate as a gateway for communications between the devices and another network. The device 200 or another device acting as the hub may operate as a gateway according to instructions from the function selector 280. For example, the hub controller 270 may instruct a connected device to cease communicating over Wi-Fi and a cellular network and communicate with the device 200 using short range radio. The communications interface 205 may receive the communications from the connected device over short range radio and output the communications using another communications technique to the recipient. Similarly, the communications interface 205 may receive communications intended for the connected device and provide those communications to the connected device over short-range radio.

The status of whether the device 200 is operating as the hub may be located in the hub status 245. The hub status 245 may be located in the memory 215 of the device 200. The hub status 245 may include data indicating whether the device 200 is operating as the hub. If the status data indicates that the device 200 is not operating as the hub, then the hub status 245 may include data identifying the device operating as the hub.

The device 200 may include hub sensors 275. The hub sensors 275 may be similar to the hub sensors 148 of FIG. 1. The hub sensors 275 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub sensors 275 may continuously generate sensors data, generate sensor data in response to an instruction from the hub controller 138, generate sensor data in response to an instruction from another device acting as the hub, generate sensor data periodically, generate sensor data in response to an event such as other sensor data satisfying a threshold, and/or generate sensor data in any other similar instance.

The memory 215 may include the connected devices storage 225. The connected devices storage 225 may be similar to the connected devices storage 158 of FIG. 1. In the case of the device 200 acting as the hub, the device 200 may be managing the connected devices. In the case of the device 200 not acting as the hub, the device 200 may store data related to the devices that the device 200 previously managed when the device 200 was acting as the hub. The connected devices storage 225 may also include instructions received from the hub. These instructions may include how and when to use various functions of the device 200.

The connected devices storage 225 may include the device functions 230, the device identifiers 235, and the device characteristics 240 that may be similar to the device functions 140, the device identifiers 152, and the device characteristics 160 of FIG. 1, respectively. The device identifiers 235 may store an identifier of the devices that the device 200 is configured to manage and identifiers of other devices that may be designated as the hub. The device 200 may mange devices that may later be designated as the hub.

The device identifiers 235 may store identifiers for the devices that have previously been managed by the device 200. This may include devices that the user of the device 200 does not carry or are not included in the vehicle of the user 200. For example, the devices that have previously been managed by the device 200 may include security cameras, doorbell cameras, streetlights, traffic lights, spotlights, public announcement systems and other speakers, and/or any other similar device. The device 200 may be managed by an organization of the user of the device 200. The organization may manage other devices similar to device 200. The organization may facilitate the exchange of data stored in the device identifiers of each of the devices. Doing so may allow the device 200 to store the device identifiers 235 of devices that have previously provided data to other devices similar to the device 200, which may reduce the time and computing resources needed to identify a device to generate and provide data.

The device characteristics 240 may store data related to the devices included in the device identifiers 235. The device characteristics 240 may include data related to features or qualities of the connected devices that may change over time. This change may occur because of usage of the device, movement of the device, environmental changes, changes in nearby devices, and/or any other similar change. In some implementations, the device characteristics 240 may include sensor data generated by sensors of the connected devices. In some implementations, the connected devices may provide the device characteristics periodically, in response to a request from the device 200, in response to an event, and/or any other similar reason. In some implementations, the device characteristics 240 may be unrelated to changes in the device that may occur because of hardware and/or software changes. The device characteristics 240 may also include a timestamp indicating the most recent update to the device characteristics 240 for each device included in the device identifiers 235.

The device functions 230 may store data related to the devices included in the device identifiers 235. The device functions 230 may be similar to the device functions 140 of FIG. 1. The device functions 230 may include data related to the capabilities of the connected devices that may not change without a modification or addition to the hardware and/or software of the device. The device functions 230 may be related to the communications abilities of the devices, the types of sensors included in the device, and/or any other similar type of capability. The device functions 230 may also include data related to the quality of the functions of each device. For example, if the function is audio capture, then the quality may relate to the bitrate, sampling rate, and/or any other similar quality metric audio capture. If the function is video capture, then the quality may relate to resolution, framerate, and/or any other similar quality metric for video capture. If the function is wireless or wired communications, then the quality may relate to the bandwidth and/or any other similar quality metric for wireless or wired communications.

The device functions 230 may also include current and/or previous instructions for each of the functions for each device included in the device identifiers 235. The instructions may relate to when the function should be active as specified by the function selector 280 and any other actions that the device should take related to that function. Some functions may be controlled by the corresponding device because the function selector 280 has not provided any instructions or the function selector 280 has cancelled previous instructions. For example, a body camera may control its camera as it normally would and data indicating that status may be in the device functions 230. The device functions 230 may also include data related to when an instruction was provided to a connected device, whether the connected device confirmed the instruction, whether the connected device appears to be complying with the instruction, and/or any other information related to the functions. The device functions 230 may also include a time period during which the device is or was instructed to generate and provide the data related to the function.

The memory 215 may include user characteristics 255. The user characteristics 255 may include data that describe the type of user who is using the device 200 and the devices included in the device identifiers 235. The type of user may include an occupation of the user, demographic information of the user, an employer of the user, and/or any other similar information. In some implementations, the user may provide the user characteristics 255 to the device 200. The user may provide the user characteristics 255 in response to prompts from the device 200.

The one or more processors 205 may implement a context determiner 285. The context determiner 285 may be similar to the context determiner 154 of FIG. 1. The context determiner 285 may be configured to determine a context of the device 200 and/or any of the devices included in the device identifiers 235. The context determiner 285 may be configured to analyze the sensor data generated by the hub sensors 275 and/or sensor data generated by sensors of any of the devices included in the device identifiers 235. The context determiner 285 may also be configured to determine events that may be occurring near or around the device 200 and/or devices included in the device identifiers 235. The context determiner 285 may determine events by analyzing news sources, websites, internet locations with current event information, first responder dispatch feeds, and/or any other similar information source. These sources may include public sources and private sources. In some implementations, the context determiner 285 may access communications between the device 200 and other devices and other communications between the user of the device 200 and other users. The context determiner 285 may analyze these various sources of information and determine the context of the device 200 and/or any devices included in the device identifiers 235.

In some implementations, the context determiner 285 may be configured to select a context from a predetermined list of contexts. This list of contexts may be dependent on the user of the device 200. For example, the list of contexts may be based on the employer of the user. If the user of the device is a police officer, then the list of contexts may be situations in which the user may be involved during the course of performing duties. The list of contexts may be dependent on the position of the user. For example, a list of contexts may be different for a police supervisor than a police officer. In some implementations, the list of contexts may be dependent on the equipment issued to the user. For example, some members of the police may received marked police vehicles and others may unmarked vehicles. These different types of vehicles may include different types of equipment such as different lights and sirens. The list of contexts for these different groups may depend on the differences between these vehicles.

The one or more processors 205 may implement a function selector 280. The function selector 280 may be similar to the function selector 150 of FIG. 1. The function selector 280 may be configured to analyze the device functions 230, the device characteristics 240, the sensor data from the hub sensors 275, the sensor data from the connected devices, the context from the context determiner 285, the user characteristics 250, and/or any other similar data to determine whether any function of the connected devices should operate differently than how that function typically operates. The function selector 280 may use the function selection models 260 and/or the function selection rules 265 to analyze these data sources. The function selection models 260 and/or the function selection rules 265 may output data identifying one or more functions of the connected devices and data indicating how those functions should operate. The function selector 280 may output those instructions to the corresponding connected device.

The function selection rules 265 may include various thresholds, ranges, hierarchies, and/or any other similar comparison tools to determine how the functions of the connected devices should operate. An example rule may specify that if the user is conducting a traffic stop and the crime score for the location of the stop is greater than a threshold, such as five out of ten, then each of the microphones and each of the cameras should be activated. Another example rule may specify that if the user is conducting a traffic stop and the crime score for the location of the traffic stop is less than a threshold, then one camera should be activated. The rule may further specify that if various resolutions of cameras are available, then the resolution to select is further based on the crime score. If the crime score is less than three out of ten, then rule may specify to select a lower resolution that is no lower than 720p. If the crime score is between three and five, then the rule may specify to select a high resolution that is at least 1080p.

As another example, a rule may specify that if the user is within a threshold distance of a gunshot that occurred in the last fifteen minutes, then all functions of the connected devices should be activated. This rule may further specify that if the user manually deactivates a function, then that function should not be reactivated even if the function would automatically be activated based on the current context.

Another example rule may be related to device 200 acting as a communication hub for the connected devices. The rule may state that the connected devices should communicate with the device 200 using short range radio and the device 200 may transmit communications from the connected devices and receive communications for the connected devices. The device 200 may use higher power communications such as cellular communications. In other words, the device 200 acts as a communication hub for the connected devices because the device 200 communicates on behalf of the connected devices.

In some implementations, this communications rule may also include references to the battery power of the connected devices and/or the device 200. For example, the rule may not apply if the battery capacity of the connected device is above sixty percent. As another example, the rule may not apply if the battery capacity of the device 200 is below forty percent. As another example, the rule may apply if the device 200 has a hardwired power supply. As another example, the rule may not apply if the signal strength of the device is below a threshold signal strength. As another example, the rule may indicate that one of the connected devices or the device 200 should operate as the communication hub if one of the connected devices or the device 200 has a signal strength that is above a threshold and the other devices have a signal strength that is below a threshold. This rule may be valid for devices that are capable of communicating with additional devices that the ones that the devices are intended to communicate with.

The function selection models 260 may be configured to receive the device functions 230, the device characteristics 240, the sensor data from the hub sensors 275, the sensor data from the connected devices, the context data from the context determiner 285, the user characteristics 250, and/or any other similar data. The function selection models 260 may output data indicating a function of a connected device to adjust and how to adjust that function. The function selection models 260 may be trained using machine learning and the historical data 255. The historical data 255 may include previous sensor data collected from the hub sensors, previous sensor data collected from the sensors of the connected devices, previous contexts, previous user characteristics, and/or any other similar data. The historical data 255 may also include data related to instances when the device 200 or another hub may have been managing the functions of the connected devices and/or periods when the functions of devices may otherwise be limited or unavailable. The historical data 255 may also include data related to how the user operated the various functions of the connected devices.

The one or more processors 205 may implement the model trainer 290. The model trainer 290 may be configured to analyze the historical data 255. The model trainer 290 may train the function selection models 260 using the historical data 255 and machine learning. The model trainer 290 may generate various data samples based on the historical data 255. Each data sample may indicate the state of the previous sensor data collected from the hub sensors, previous sensor data collected from the sensors of the connected devices, previous contexts, previous user characteristics, and/or any other similar data at a point in time. Each data sample may also include a label that indicates the state of the various functions of the connected devices, how the devices were communicating with each other and/or with other devices and networks, and/or how the user activated the various functions of the devices. The resulting models may be able to receive device functions 230, the device characteristics 240, the sensor data from the hub sensors 275, the sensor data from the connected devices, the context from the context determiner 285, the user characteristics 250, and/or any other similar data and output data indicating which functions should be active or inactive, how the connected devices should communicate with the device 200 and/or with other devices, which device should operate as the hub, and/or any other similar recommendation.

In some implementations, the function selector 280 may implement the recommendation. The model trainer 290 may continue to collect the historical data 255 as the device 200 operates. In this case, the model trainer 290 may update the historical data 255 and retrain the function selection models 260 using the updated historical data 255 and machine learning. The function selector 280 may utilize the updated function selection models 260 to analyze the device functions 230, the device characteristics 240, the sensor data from the hub sensors 275, the sensor data from the connected devices, the context from the context determiner 285, the user characteristics 250, and/or any other similar data that may have updated since the last analysis.

In some implementations, the model trainer 290 may train the function selection models 260 without context data. In this case, the data used by the context determiner 285 may be part of the data samples. In this way, the resulting models may be able to receive device functions 230, the device characteristics 240, the sensor data from the hub sensors 275, the sensor data from the connected devices, the user characteristics 250, and/or any other similar data and output data indicating which functions should be active or inactive, how the connected devices should communicate with the device 200 and/or with other devices, which device should operate as the hub, and/or any other similar recommendation.

The model trainer 290 may also be configured to analyze the historical data 255 and generate the function selection rules 265. The model trainer 290 may analyze the historical data 255 for patterns to identify ranges and threshold and other similar comparison techniques to use to analyze the device functions 230, the device characteristics 240, the sensor data from the hub sensors 275, the sensor data from the connected devices, the context from the context determiner 285, the user characteristics 250, and/or any other similar data. In some implementations, the model trainer 290 may receive goals from a user that the model trainer 290 should try to achieve when generating the function selection rules 265. For example, the goals may include preserving battery life, ensuring image resolution is above a threshold a certain percentage of the time, ensuring the framerate is above a threshold a certain percentage of the time, ensuring audio and video is captured in areas with crime rates above a threshold, and/or any other similar goal. In addition to relating to functions, the function selection rules 265 may be related to selecting a device for a hub. In some implementations, the device 200 may also receive function selection rules 265 from a user. These rules may also be related to specific goals of the user and may be specifically tailored for particular devices.

In some implementations, the function selector 280 may output an exception or error. This may occur because the function selector 280 determined that none of the available device functions 230 are appropriate based on the analysis of the device functions 230, the device characteristics 240, the sensor data from the hub sensors 275, the sensor data from the connected devices, the context from the context determiner 285, the user characteristics 250, and/or any other similar data. In this case, the function selection rules 265 and/or the function selection models 260 may output errors indicating that none of the available device functions 230 are appropriate based on the analyzed data. This may occur if there are limited available device functions 230 because there may be only one or two available devices included in the device identifiers 235 and the functions of those devices may be limited such as outputting audio and/or communicating using short range radio.

If the function selector 280 outputs an exception, the function selector 280 may utilize the function type selector 282. The function type selector 282 may be similar to the function type selector 149 of FIG. 1. The function type selector 282 may be configured to analyze the device functions 230, the device characteristics 240, the sensor data from the hub sensors 275, the sensor data from the connected devices, the context from the context determiner 285, the user characteristics 250, and/or any other similar data and select one or more functions that are appropriate based on that data. The selected functions may be those that are not included in the available device functions 230.

The one or more processors 205 may implement the device locator 288. The device locator 288 may be similar to the device locator 147 of FIG. 1. The device locator 288 may be configured to generate a request for devices in the vicinity of the device 200 and/or another device that are capable of performing the type of function selected by the function type selector 282 and that are located within a threshold distance. The threshold distance may be determined by the threshold selector 284. The threshold selector 284 may be similar to the threshold selector 151 of FIG. 1.

The threshold selector 284 may be configured to determine a threshold distance within which the device locator 288 searches for a device that is capable of performing the type of function selected by the function type selector 282. The threshold selector 284 may select the threshold based on the function type, the device functions 230, the device characteristics 240, the sensor data from the hub sensors 275, the sensor data from the connected devices, the context from the context determiner 285, the user characteristics 250, and/or any other similar data. For example, the threshold selector 284 may select a larger threshold distance for a speaker to output audio than a light to illuminate an area. As another example, the threshold selector 284 may select a larger threshold distance for a context that suggests a higher risk to the user of the device 200 and a lower threshold distance for a context that suggests a lower risk to the user of the device 200.

In some implementations, the hub controller 270 may determine that a device that is performing a function as requested by the device 200 and providing data to the device 200 is no longer providing the data to the device 200. This may be for various reasons such as the communication channel between the device providing data and the device 200 is no longer functional, the device providing the data has suffered damage, and/or any other similar reason. In this case, the hub controller 138 may instruct the device locator 288 to locate an additional device that is capable of performing the same function as the lost function. The device locator 288 may use a similar technique as it uses to search for other devices such as requesting the communications interface 205 broadcast a request. The device locator 288 may search for a device that is located in a similar location as the device with the lost function. In some implementations, the device locator 288 may request that the threshold selector 284 select a threshold distance from the device with the lost function. The threshold distance may be based on the lost function, the device functions 230, the device characteristics 240, the sensor data from the hub sensors 275, the sensor data from the connected devices, the context from the context determiner 285, the user characteristics 250, and/or any other similar data.

Figure 3:
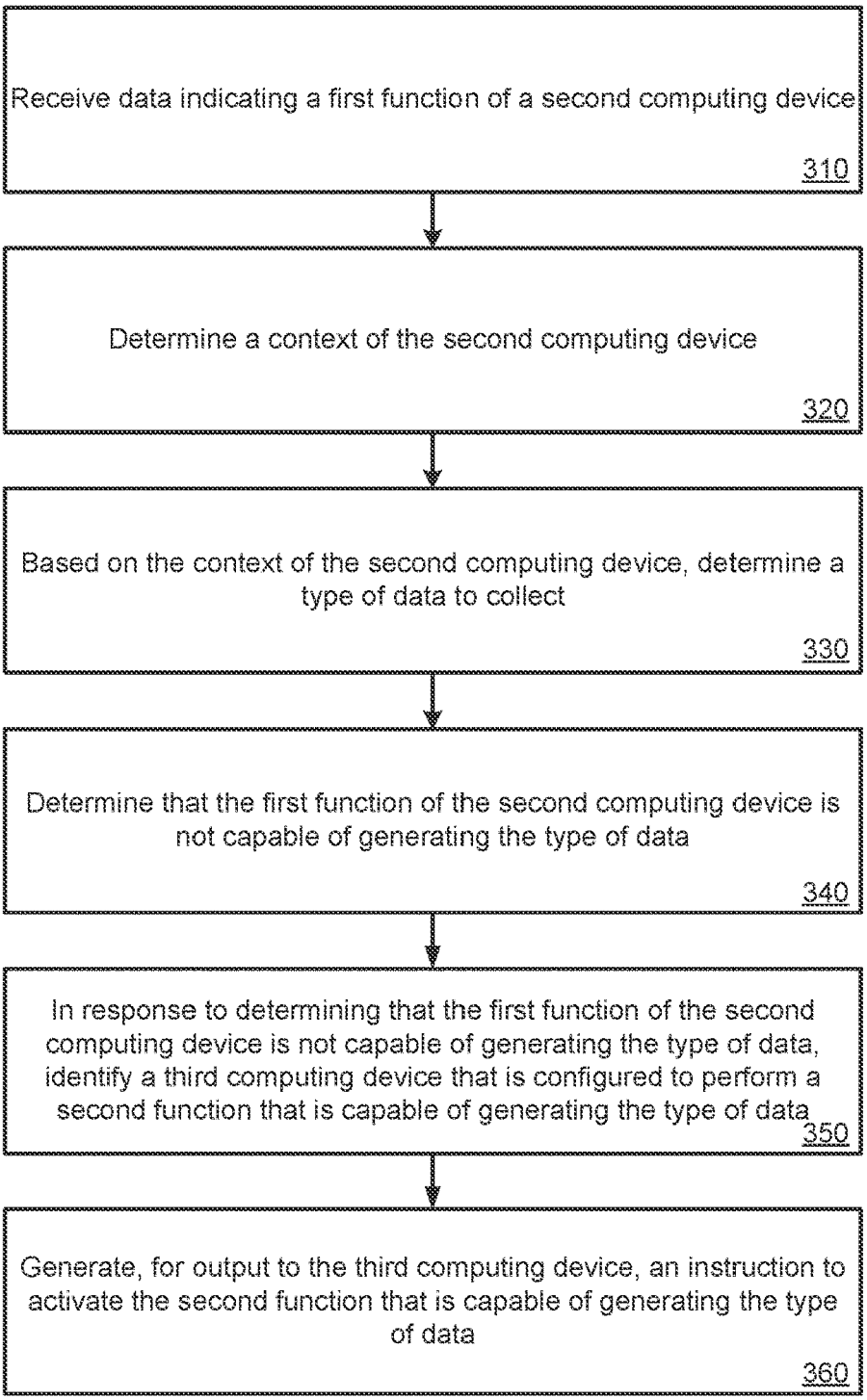
FIG. 3 is a flowchart of an example process for managing the functionality of various devices.

FIG. 3 is a flowchart of an example process 300 for managing the functionality of various devices. In general, the process 300 determines the functions that various devices are capable of performing. The process 300 determines the context of those devices. Based on that context, the process 300 determines that the process 300 should have access to a particular type of data, but none of the functions of the various devices generate that data. The process 300 locates a device that is capable of performing the function to generate that data and instructs that device to generate and provide that data. The process 300 will be described as being performed by the mobile phone 162 of FIG. 1 and will include references to other components in FIG. 1. The process 300 may also be performed by the device 200 of FIG. 2.

The mobile phone 162 receives data indicating a first function of a second computing device (310). In some implementations, the first function may be related to actions that the hardware and/or software of the second computing device can perform. For example, the first function may be capturing audio, capturing images, capturing video, communicating using RF communications, communicating using short-range radio, communicating using infrared, communicating using Wi-Fi, communicating using a cellular network, detecting temperature, detecting acceleration, detecting motion, detecting location, detecting pressure, detecting ambient light, detecting cardinal direction, detecting gravity, detecting the proximity of objects, detecting magnetic fields, detecting water, detecting solar flux, detecting ultraviolet light, and/or performing any other similar function. In some implementations, the second computing device may be any type of device that is capable of communicating with the mobile phone 162 and/or other devices.

The mobile phone 162 determines a context of the second computing device (320). The mobile phone 162 may analyze various sources of information to determine the context of the second computing device. The mobile phone 162 may analyze the sensor data collected from the sensors of the second computing device. The mobile phone 162 may also access public sources of information that may relate to news, weather, current event, public crime data, court records, and/or any other similar activity that may be affecting what is occurring in the vicinity of the second computing device. These public sources may include websites available on the internet, public APIs, radio signals, and/or any other similar public data. The mobile phone 162 may also access private data sources. The private data sources may include intranet data related to an employer of the user of the mobile phone 162. For example, the user may be a police officer and the private data may relate information related to ongoing investigations, non-public crime data, and/or any other similar internal police data. In some implementations, the mobile phone 162 determine the context of the mobile phone 162. In some implementations, the mobile phone 162 determines the context of the user of the mobile phone 162. In some implementations, the mobile phone 162 determines the context of a specific location, such as a location to where the user of the mobile phone 162 is dispatched.

Based on the context of the second computing device, the mobile phone 162 determines a type of data to collect (330). In some implementations, the mobile phone 162 determines the type of data to collect based on the context of the mobile phone 162, the context of the user of the mobile phone 162, the context of the specific location, and/or the context of the second computing device. The mobile phone 162 may further determine the type of data to collect based on the characteristics of the second computing device and/or the characteristics of the mobile phone 162.

The mobile phone 162 determines that the first function of the second computing device is not capable of generating the type of data (340). The mobile phone 162 may compare the function required to collect the type of data to the first function and determine that the functions do not match.

In response to determining that the first function of the second computing device is not capable of generating the type of data, the mobile phone 162 identifies a third computing device that is configured to perform a second function that is capable of generating the type of data (350). In some implementations, the mobile phone 162 may determine a threshold distance within which to search for the third computing device. The threshold distance may be relative to the user of the mobile phone 162, the mobile phone 162, the second computing device, and/or a specific location. The threshold distance may be based on the type of data to generate, the context of the second computing device, the context of the mobile phone 162, the context of the user of the mobile phone 162, and/or the context of the specific location.

The third computing device may be one that belongs to a user associated with the user of the mobile phone 162. For example, the third computing device may belong to a fellow officer of the officer who is using the mobile phone 162. The third computing device may be a camera on a building, a street light, a public announcement system, and/or any other similar device.

The mobile phone 162 generates, for output to the third computing device, an instruction to activate the second function that is capable of generating the type of data (360). In some implementations, the instruction may include a time period for which the third computing device should activate the second function. The instruction may also include a request to provide the generated data to the mobile phone 162 and/or another computing device. In some implementations, the mobile phone 162 may monitor to ensure that the third computing device does not move outside of the threshold distance. This may occur if the reference point and/or the third computing device moves. If the third computing device moves outside of the threshold distance, then the mobile phone 162 may attempt to identify an additional computing device that can collect the specified data and that is within the threshold distance. If the third computing device moves outside of the threshold distance, the mobile phone 162 may also provide an instruction to the third computing device to cease providing the requested data.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   providing, for output by a first computing device and to a second computing device, a request for data indicating functions of the second computing device;
   in response to providing the request for the data indicating the functions of the second computing device, receiving, by a first computing device and from the second computing device, data indicating a first function of the second computing device;
   generating, by the first computing device, first sensor data that reflects first characteristics of the first computing device;
   providing, for output by the first computing device and to the second computing device, a request for second sensor data that reflects second characteristics of the second computing device;
   in response to providing the request for the second sensor data, receiving, by the first computing device and from the second computing device, the second sensor data that reflects the second characteristics of the second computing device;
   based on the first sensor data that reflects the first characteristics of the first computing device and the second sensor data that reflects the second characteristics of the second computing device, determining, by the first computing device, a context of the second computing device;
   based on the context of the second computing device, determining, by the first computing device, a type of media data to collect;
   determining, by the first computing device, that the first function of the second computing device is not capable of generating the type of media data;
   in response to determining that the first function of the second computing device is not capable of generating the type of media data, identifying, by the first computing device, a third computing device that is configured to perform a second function that is capable of generating the type of media data; and
   generating, for output by the first computing device and to the third computing device, an instruction to activate the second function that is capable of generating the type of media data.

2. The method of claim 1, wherein identifying the third computing device that is configured to perform a second function that is capable of generating the type of media data comprises determining that the third computing device is within a threshold distance of the first computing device or the second computing device.

3. The method of claim 2, comprising:
   determining, by the first computing device, that the third computing device is outside of the threshold distance of the first computing device or the second computing device; and
   based on determining, by the first computing device, that the third computing device is outside of the threshold distance of the first computing device or the second computing device, generating, for output by the first computing device and to the third computing device, an indication that the first computing device ceases control of the second function.

4. The method of claim 2, comprising:
   based on the type of media data to collect, determining, by the first computing device, the threshold distance.

5. The method of claim 2, comprising:
   based on the context of the second computing device, determining, by the first computing device, the threshold distance.

6. The method of claim 1, comprising:
   based on the first sensor data that reflects the first characteristics of the first computing device and the second sensor data that reflects the second characteristics of the second computing device, determining, by the first computing device, a context of the first computing device,
   wherein determining the type of media data to collect is further based on the context of the first computing device.

7. The method of claim 1, comprising:
   determining, by the first computing device, characteristics of the third computing device,
   wherein identifying the third computing device is further based on the characteristics of the third computing device.

8. A system, comprising:
one or more processors; and
memory including a plurality of computer-executable components that are executable by the one or more processors to perform a plurality of actions, the plurality of actions comprising:
providing, for output by a first computing device and to a second computing device, a request for data indicating functions of the second computing device;
in response to providing the request for the data indicating the functions of the second computing device, receiving, by a first computing device and from the second computing device, data indicating a first function of the second computing device;
generating, by the first computing device, first sensor data that reflects first characteristics of the first computing device;
providing, for output by the first computing device and to the second computing device, a request for second sensor data that reflects second characteristics of the second computing device;
in response to providing the request for the second sensor data, receiving, by the first computing device and from the second computing device, the second sensor data that reflects the second characteristics of the second computing device;
based on the first sensor data that reflects the first characteristics of the first computing device and the second sensor data that reflects the second characteristics of the second computing device, determining, by the first computing device, a context of the second computing device;
based on the context of the second computing device, determining, by the first computing device, a type of media data to collect;
determining, by the first computing device, that the first function of the second computing device is not capable of generating the type of media data;
in response to determining that the first function of the second computing device is not capable of generating the type of media data, identifying, by the first computing device, a third computing device that is configured to perform a second function that is capable of generating the type of media data; and
generating, for output by the first computing device and to the third computing device, an instruction to activate the second function that is capable of generating the type of media data.

9. The system of claim 8, wherein identifying the third computing device that is configured to perform a second function that is capable of generating the type of media data comprises determining that the third computing device is within a threshold distance of the first computing device or the second computing device.

10. The system of claim 9, wherein the actions comprise:
determining, by the first computing device, that the third computing device is outside of the threshold distance of the first computing device or the second computing device; and
based on determining, by the first computing device, that the third computing device is outside of the threshold distance of the first computing device or the second computing device, generating, for output by the first computing device and to the third computing device, an indication that the first computing device ceases control of the second function.

11. The system of claim 9, wherein the actions comprise:
based on the type of media data to collect, determining, by the first computing device, the threshold distance.

12. The system of claim 9, wherein the actions comprise:
based on the context of the second computing device, determining, by the first computing device, the threshold distance.

13. The system of claim 8, wherein the actions comprise:
based on the first sensor data that reflects the first characteristics of the first computing device and the second sensor data that reflects the second characteristics of the second computing device, determining, by the first computing device, a context of the first computing device,
wherein determining the type of media data to collect is further based on the context of the first computing device.

14. The system of claim 8, wherein the actions comprise:
determining, by the first computing device, characteristics of the third computing device,
wherein identifying the third computing device is further based on the characteristics of the third computing device.

15. One or more non-transitory computer-readable media of a computing device storing computer-executable instructions that upon execution cause one or more computers to perform acts comprising:
providing, for output by a first computing device and to a second computing device, a request for data indicating functions of the second computing device;
in response to providing the request for the data indicating the functions of the second computing device, receiving, by a first computing device and from the second computing device, data indicating a first function of the second computing device;
generating, by the first computing device, first sensor data that reflects first characteristics of the first computing device;
providing, for output by the first computing device and to the second computing device, a request for second sensor data that reflects second characteristics of the second computing device;
in response to providing the request for the second sensor data, receiving, by the first computing device and from the second computing device, the second sensor data that reflects the second characteristics of the second computing device;
based on the first sensor data that reflects the first characteristics of the first computing device and the second sensor data that reflects the second characteristics of the second computing device, determining, by the first computing device, a context of the second computing device;
based on the context of the second computing device, determining, by the first computing device, a type of media data to collect;
determining, by the first computing device, that the first function of the second computing device is not capable of generating the type of media data;
in response to determining that the first function of the second computing device is not capable of generating the type of media data, identifying, by the first computing device, a third computing device that is configured to perform a second function that is capable of generating the type of media data; and generating, for output by the first computing device and to the third computing device, an instruction to activate the second function that is capable of generating the type of media data.

16. The media of claim 15, wherein identifying the third computing device that is configured to perform a second function that is capable of generating the type of data comprises determining that the third computing device is within a threshold distance of the first computing device or the second computing device.

17. The media of claim 16, wherein the acts comprise:
determining, by the first computing device, that the third computing device is outside of the threshold distance of the first computing device or the second computing device; and
based on determining, by the first computing device, that the third computing device is outside of the threshold distance of the first computing device or the second computing device, generating, for output by the first computing device and to the third computing device, an indication that the first computing device ceases control of the second function.

18. The media of claim 16, wherein the acts comprise:
based on the type of media data to collect and the context of the second computing device, determining, by the computing device, the threshold distance.

19. The media of claim 15, wherein the acts comprise:
based on the first sensor data that reflects the first characteristics of the first computing device and the second sensor data that reflects the second characteristics of the second computing device, determining, by the first computing device, a context of the first computing device,
wherein determining the type of media data to collect is further based on the context of the first computing device.

20. The media of claim 15, wherein the acts comprise:
determining, by the first computing device, characteristics of the third computing device,
wherein identifying the third computing device is further based on the characteristics of the third computing device.

* * * * *